US005486031A

United States Patent [19]
Ronchetti et al.

[11] Patent Number: 5,486,031
[45] Date of Patent: Jan. 23, 1996

[54] SLIDEABLE MOUNTING ASSEMBLY FOR PICKUP TRUCK TOPPERS

[76] Inventors: David K. Ronchetti, 14201 Aspen Ave. NE., Prior Lake, Minn. 55372; Robert A. Ronchetti, 3018 - 6th Ave. East; William L. Ronchetti, 1110 E. Howard St., both of Hibbing, Minn. 55746

[21] Appl. No.: 213,261

[22] Filed: Mar. 15, 1994

[51] Int. Cl.⁶ .................................................. B60P 3/32
[52] U.S. Cl. .................... 296/10; 296/35.3; 296/100; 296/164; 296/167; 410/10; 414/498
[58] Field of Search .......................... 296/10, 35.3, 100, 296/102, 164, 165, 156, 167, 36; 135/88; 414/498; 410/80, 90, 91

[56]  References Cited

U.S. PATENT DOCUMENTS

| | | | |
|---|---|---|---|
| 1,008,713 | 11/1911 | Grace | 296/35.3 |
| 1,604,139 | 10/1926 | Werner | 296/35.3 X |
| 2,156,282 | 5/1939 | Fitch | 410/90 |
| 2,156,283 | 5/1939 | Fitch | 410/90 |
| 3,475,049 | 10/1969 | Overhulser | 296/167 |
| 3,598,261 | 8/1971 | Anderson . | |
| 3,655,234 | 4/1972 | Kirschbaum | 296/167 |
| 3,773,380 | 11/1973 | Stockdill | 296/100 |
| 3,850,471 | 11/1974 | Johnson | 296/156 |
| 3,897,100 | 7/1975 | Gardner | 296/10 |
| 3,901,548 | 8/1975 | Seaman, Jr. | 296/10 |
| 4,489,977 | 12/1984 | Earing, Jr. | 296/35.3 |
| 4,648,649 | 3/1987 | Beal | 296/156 |
| 4,693,508 | 9/1987 | Pettit | 296/100 |
| 4,810,158 | 3/1989 | Bitzer | 414/498 |
| 4,832,396 | 5/1989 | Moreno et al. | 296/164 |
| 5,052,739 | 10/1991 | Irwin | 296/37.6 |
| 5,090,765 | 2/1992 | Gremillion | 296/166 X |

FOREIGN PATENT DOCUMENTS

3814654  11/1989  Germany ................................. 296/36

Primary Examiner—Dennis H. Pedder
Attorney, Agent, or Firm—Peterson, Wicks, Nemer & Kamrath

[57] ABSTRACT

An assembly (10) is disclosed including first slides (38) secured by bolts (64) to a topper (26) and second slides (36) secured by bolts (68) to the side walls (18) of a pickup truck (12). The first and second slides (36, 38) are of a tubular shape, with each of the first slides (38) further including first and second vertical legs (44) located on opposite sides of the second slides (36) and a horizontal seal leg (46) for sandwiching a seal (66) against the topper (26). First connectors (50) having female head portions (52) and second connectors (60) having male head portions (62) horizontally slideably received in the female head portions (52) include tabs (54) slideably received in the ends of the tubular shape of the slides (36, 38) and secured therein by the securement bolts (64, 68). A tubular weatherstrip (88) is slid on a cross bar (90) held by L-shaped portions formed on the connectors (50) of the front ends of the second slides (36). L-shaped corner locks (80) are slideably received by dovetail joints to the vertical leg (74) of the L-shaped portions. With the connectors (50, 60) interlocked by horizontally sliding the head portions (52, 62) together, the slides (36, 38) are prevented from being separated vertically. However, when horizontally slid from the interlocking position, the slides (36, 38) can be separated vertically allowing tipping of the first slides (38) relative to the second slides (36).

36 Claims, 3 Drawing Sheets

SLIDEABLE MOUNTING ASSEMBLY FOR PICKUP TRUCK TOPPERS

BACKGROUND

The present invention generally relates to slideable mounting assemblies, particularly to assemblies for slideably mounting covers or the like to a box or other object, and specifically in the most preferred form to assemblies for slideably mounting toppers to pickup trucks.

Because of the difficulties of removal and replacement of toppers on pickup trucks by direct securement such as by bolts, latches, or other fasteners, various slide mount assemblies have been developed which allow the topper to be slid from the pickup truck. However, prior slide mount assemblies had serious shortcomings which have limited their commercial viability. For example, prior slide mount assemblies included interlocking slide rails on the topper and the pickup truck. Thus, in order for the topper to be slid on the pickup truck, the topper had to be at a horizontal position corresponding to the horizontal position of the slide rails. Thus, either two or more people were required to maneuver the topper to the proper position and/or the topper had to be held by jacks or other temporary support members. Further, access was limited to the front of the topper (if slid rearward on the pickup truck) or through the rear of the topper and pickup truck and specifically it was not possible to tip the topper from side-to-side or end-to-end to gain access. Likewise, prior slide mount assemblies were of a bulky, elongated size which was difficult to package and ship. Further, prior slide mount assemblies were very time consuming and difficult to install to the pickup truck and topper.

Thus, a need continues to exist for an assembly allowing ease of removal and replacement of toppers on pickup trucks and which overcomes the many shortcomings of prior slide mount assemblies utilized for that purpose.

SUMMARY

The present invention solves this need and other problems in the field of slideably mounting covers or the like to a box or other object and in the most preferred form in the field of slideably mounting toppers to pickup trucks by providing, in the most preferred form, members for interlocking the ends of first and second slides in an interlocking position, which allows sliding of the slides in a first, horizontal direction from the interlocking position but which prevents sliding in the opposite, horizontal direction from the interlocking position and prevents separation of the slides by movement perpendicular to the first direction which is vertical in the most preferred form when the slides are in the interlocking position.

In further aspects of the present invention, unique sealing is provided between the topper and the pickup truck. Specifically, in one aspect of the present invention, L-shaped corner locks are provided having first legs removably secured to the front ends of the slide rails attached to the side walls of the pickup truck and extending parallel to the pickup box front wall and second legs extending parallel to the pickup box side walls. In the most preferred form, the first legs are removably secured to the slide rails with the second legs at differing spacing from the slide rails to correspond to the pickup box side walls and longitudinal side seals of the topper.

In another aspect of the present invention, a crossbar having a weatherstrip slid thereon is removably secured to the front ends of the slide rails attached to the side walls of the pickup truck to seal between the front walls of the pickup truck box and topper.

Thus, it is an object of the present invention to provide a novel assembly for slideably mounting covers or the like to a box or other object.

It is a further object of the present invention to provide such a novel slideable mounting assembly for mounting toppers to pickup trucks.

It is a further object of the present invention to provide such a novel slideable mounting assembly allowing the topper or the like to be tipped relative to the pickup truck or the like to which it is slideably mounted.

It is a further object of the present invention to provide such a novel slideable mounting assembly allowing ease of removal and replacement of toppers or the like, even by a single person.

It is a further object of the present invention to provide such a novel slideable mounting assembly allowing access to the pickup truck box or the like by tipping the topper or the like from side-to-side or end-to-end.

It is a further object of the present invention to provide such a novel slideable mounting assembly which is relatively easy to package and ship.

It is a further object of the present invention to provide such a novel slideable mounting assembly which is relatively easy to fabricate while reducing capital costs.

It is a further object of the present invention to provide such a novel slideable mounting assembly which is relatively easy to install.

It is a further object of the present invention to provide such a novel slideable mounting assembly including unique provisions for sealing between the front walls of the topper and truck cargo box.

It is a further object of the present invention to provide such a novel slideable mounting assembly including unique provisions for sealing at the front corners of the topper and truck cargo box.

It is a further object of the present invention to provide such a novel slideable mounting assembly having sealing provisions which can be varied according to the particular installation.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the invention.

DESCRIPTION

An assembly for slideably mounting a cover to a body is shown in the drawings in the most preferred form for slideably mounting a topper to pickup truck box side walls according to the preferred teachings of the present invention and generally designated 10. Truck 12 generally includes a cab 14 and a cargo box 16. Cargo box 16 is defined by first and second, parallel, side walls 18, a front wall 22 extending between the front ends of walls 18, and a tailgate 24 pivotally mounted to extend between the back ends of walls 18. Topper 26 generally includes first and second, parallel side walls 28, a front wall 30 extending between the front ends of walls 28, a top 32 extending across and interconnecting the upper edges of walls 28 and 30, and a rear door 34 generally hinged to top 32 and extending between the back ends of walls 28.

Assembly 10 according to the preferred teachings of the present invention generally includes first and second truck slide rails 36 for placement along the upper edges of walls 18. In the most preferred form, rails 36 are each formed of two or more components which are telescopically received such that rails 36 can be shipped in a collapsed condition and can be extended to a length generally equal to but slightly shorter than the length of walls 28. In the most preferred form, rails 36 are formed of extruded aluminum and have annular vertical cross sections of a generally rectangular shape, with rails 36 including upper slide surfaces which are free of obstructions or depressions.

Assembly 10 according to the preferred teachings of the present invention further generally includes first and second topper slide rails 38 for placement along the lower edges of walls 28. In the most preferred form, rails 38 are formed of extruded plastic and each have a tubular portion 40 having annular vertical cross sections of a generally rectangular shape of a width slightly smaller than the width of the vertical cross sections of slides 36. Tubular portions 40 include lower slide surfaces which are free of obstructions or depressions. First and second L-shaped members have first legs 42 integrally extending horizontally in the same plane and on opposite sides of the lower slide surfaces of tubular portion 40 of each rail 38 and second legs 44 extending vertically from the outer ends of legs 42, with the spacing between legs 44 being generally equal to but slightly larger than the width of slide rails 36 for slideable receipt therebetween. Rails 38 each further includes a third leg 46 extending horizontally from the outer edge of tubular portion 40 intermediate the top and bottom of tubular portion 40. Barbs 48 extend from the upper surfaces of legs 46 adjacent the outer free edges thereof. In the most preferred form, rails 38 are each formed of two or more components which are secured in an end-to-end manner through the use of connectors, not shown, which are slideably received in tubular portions 40. Thus, rails 38 can be shipped in an unconnected manner and connected together for installation, with rails 38 being cut, if required, to a length generally equal to but slightly shorter than the length of walls 28 and generally equal to the length of rails 36.

Assembly 10 further includes in the most preferred form first slide connectors 60 secured adjacent to the front ends of rails 38 and the rear ends of rails 36. Connectors 60 each generally include a male head portion 62 arranged parallel to the slide surfaces of rails 36 and 38, with head portions 62 located beyond the ends of rails 36 and 38. Tabs 54 integrally extend from head portions 62 for connecting head portions 62 to rails 36 and 38. In the most preferred form, each tab 54 generally includes a plate 56 having a width generally equal to and for slideable receipt in slide rails 36 and of tubular portions 40 of slide rails 38 parallel to the slide surfaces of rails 36 and 38 and of a height substantially smaller than slide rails 36 and tubular portions 40 of slide rails 38. Parallel protuberances 58 are integrally formed on plate 56 parallel to the slide surfaces of rails 36 and 38 and extending in spaced, parallel relation in the form shown in FIGS. 2–5 across the width of plate 56, with the height of protuberances 58 being generally equal to and for slideable receipt in slide rails 36 and tubular portions 40 of slide rails 38.

Assembly 10 further includes in the most preferred form second slide connectors 50 secured to the front ends of rails 36 and the rear ends of rails 38. Connectors 50 each generally include a female head portion 52 including a socket of a shape complementary to and for horizontally slideably receiving head 62 of connectors 60. At least part of head portions 52 of connectors 50 are located beyond the ends of rails 36 and 38, with the sockets of head portions 52 being parallel to and vertically offset from the slide surfaces of rails 36 and 38. Tab 54 integrally extends from head portion 52 of each connector 50 for connecting head portion 52 to rails 36 and 38.

Figure 5:
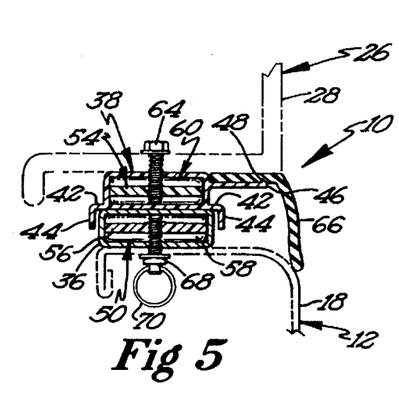
FIG. 5 shows a cross-sectional view of the slideable mounting assembly of FIG. 1.
Figure 6:
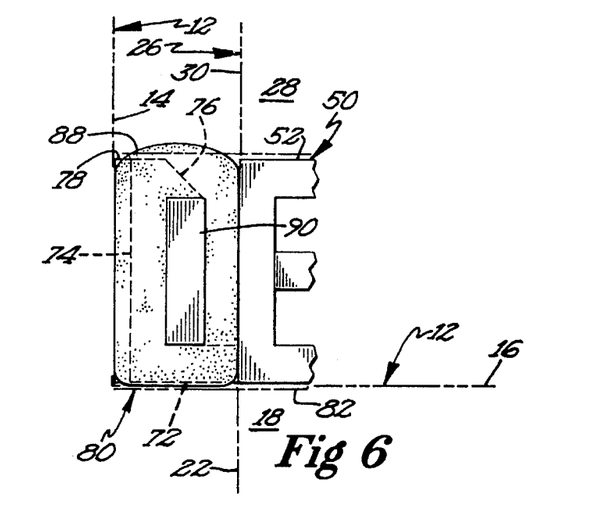
FIG. 6 shows a partial, end view of the slideable mounting assembly of FIG. 1 according to view line 6—6 of FIG. 3.
Figure 7:
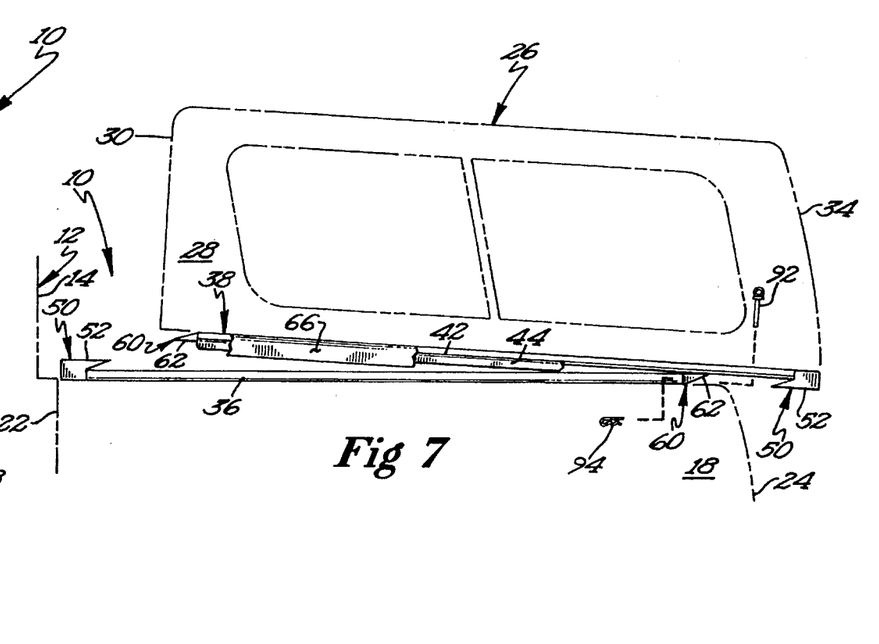
FIG. 7 shows a diagramatic side view of the slideable mounting assembly of FIG. 1, with the topper slid from its interlocking position and tipped end-to-end relative to the pickup truck.

In the most preferred form as best seen in FIG. 5, bolts 64 extend through the bottom edges of walls 28 and are threadably received in at least the upper portions of tubular portion 40 and tabs 54 for securing rails 38 to topper 26 and tabs 54 and thus connectors 50 and 60 to rails 38, with bolts 64 not extending beyond the lower slide surfaces of tubular portions 40 of slide rails 38. Assembly 10 in the most preferred form includes an L-shaped gasket seal 66 of a length generally equal to walls 28 and having a first leg portion sandwiched between legs 46 of rails 38 and the bottom edges of walls 28, with barbs 48 holding legs 46 from sliding therebetween. Bolts 68 extend through the upper edges of walls 18 and are threadably received in at least the lower portions of slide rails 36 and tabs 54 for securing rails 36 to cargo box 16 and tabs 54 and thus connectors 50 and 60 to rails 36, with bolts 68 not extending beyond the upper slide surfaces of slide rails 36. In the most preferred form, the heads of bolts 68 include tie-down rings 70 for passage of a rope or strap therethrough for holding cargo in cargo box 16.

Figure 8:
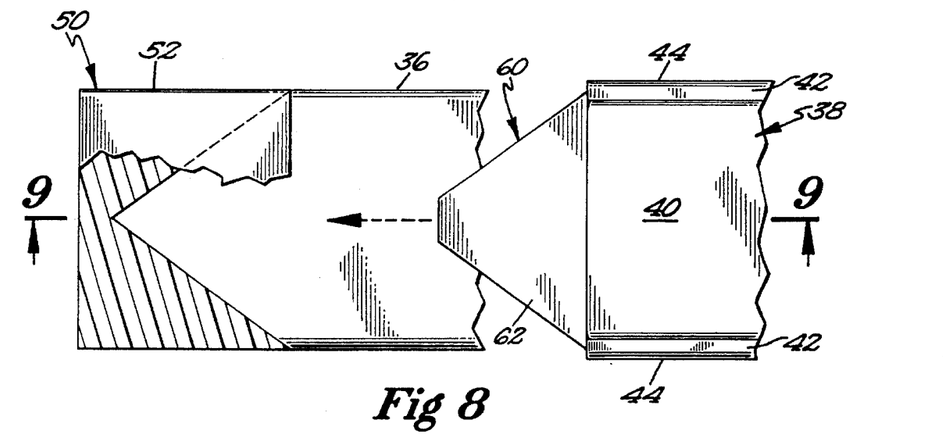
FIG. 8 shows a diagramatic, partial, top plan view of an alternate embodiment of a slideable mounting assembly according to the preferred teachings of the present invention, with portions broken away to show constructional details.
Figure 9:
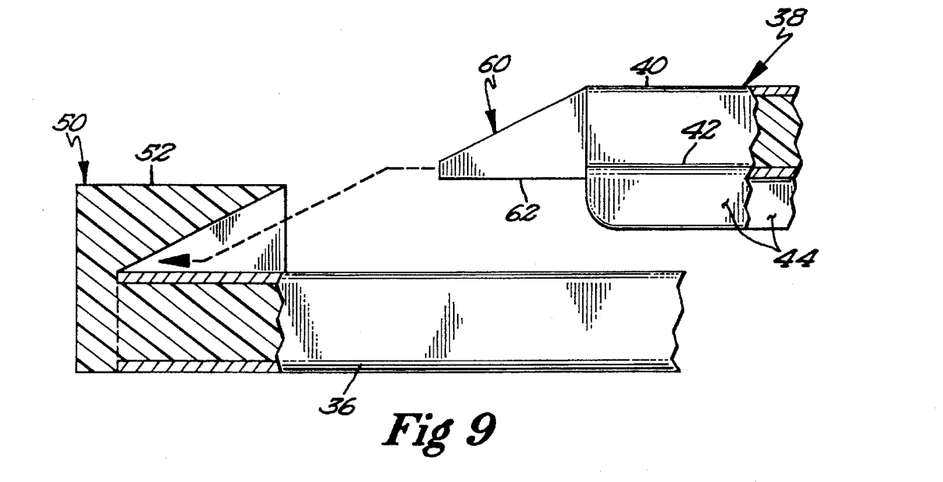
FIG. 9 shows a diagramatic, cross-sectional view of the slideable mounting assembly of FIG. 8 according to section line 9—9 of FIG. 8.

In the preferred forms of the present invention, male head portions 62 and the sockets of female head portions 52 are wedge-shaped. Specifically, in the form shown in FIGS. 2 and 7–9, male head portions 62 and the sockets of female head portions 52 are wedge-shaped of an increasing size perpendicular to the slide surfaces of rails 36 and 38 and each include a first surface which is located beyond the ends and contiguous with and in the same plane as the slide surfaces of rails 36 and 38. Additionally, male head portions 62 and the sockets of female head portions 52 each include a second surface which is located beyond the ends and at an acute angle in the order of 30° to the slide surfaces of rails 36 and 38. The wedge shape of the first and second surfaces of head portions 62 and the sockets of female head portions 52 perpendicular to the slide surfaces of rails 36 and 38 is advantageous in camming the slide surfaces of the ends of rails 36 and 38 vertically together when connectors 50 and 60 are slid relative to each other into their interlocking position. In the form shown in FIGS. 8 and 9 (without leg 46 for ease of illustration), male head portions 62 and the sockets of female head portions 52 are also wedge-shaped of an increasing size parallel to the slide surfaces of rails 36 and 38 and each include third and fourth vertical surfaces extending perpendicular to the first surfaces of male head portions 62 and the sockets of female head portions 52 and to the slide surfaces of rails 36 and 38 and which converge towards each other as they extend beyond the ends of rails 36 and 38. The wedge shape of the third and fourth surfaces of head portions 62 and the sockets of female head portions 52 parallel to the slide surfaces of rails 36 and 38 is advantageous in camming the slide surfaces of the ends of rails 36 and 38 horizontally to a centered condition when connectors 50 and 60 are slid relative to each other into their interlocked position and prevent the ends of rails 36 and 38 from sliding horizontally upon the slide surfaces in a direction perpendicular to rails 36 and 38 and the horizontal slide direction of topper 26 upon truck 12. To allow formation by injection molding, protuberances 58 may be arranged longitudinally on plate 56 when connectors 50 shown in FIGS. 8 and 9 are utilized.

Connectors 50 secured to rails 36 in the most preferred form include an L-shaped portion having a first horizontal leg 72 and a vertical leg 74. Leg 72 extends from head portion 52 in the opposite direction from rails 36. Leg 74 extends from the outer end of leg 72 generally parallel and spaced from head portion 52. A ratchet-type catch 76 is formed on the inner side of leg 74 adjacent the upper edge thereof and spaced from leg 72. A male component in the preferred form of a vertical tenon 78 of a dovetail joint is formed on the outer side of leg 74 opposite head 52.

Assembly 10 in the most preferred form of the present invention includes first and second L-shaped corner locks 80 each including a first leg 82 arranged parallel to the horizontal slide direction of rails 36 and 38 for abutting the top edges of walls 18 and the outer surfaces of seal 66 adjacent the front ends thereof. Each corner lock 80 further includes a second leg 84 for abutting the top edge of front wall 22 adjacent the outer ends thereof. The inner surface of leg 84 includes a plurality (with 3 being shown) of female components in the preferred form of vertical mortises 86 of a dovetail joint, with each mortise 86 being of a size and shape for vertical slideable receipt on tenons 78 of connectors 50 of rails 36. Thus, leg 84 can be positioned at differing spacing from slides 36 depending upon which mortise 86 tenon 78 is slideably received.

Assembly 10 in the preferred form of the present invention further includes a weatherstrip element attached to rails 36 generally perpendicular to rails 36 and the horizontal slide direction of rails 36 and 38 to seal between front walls 22 and 30 of truck 12 and topper 26, respectively. In the most preferred form, the weatherstrip element includes a tubular weatherstrip 88 slid over a crossbar 90. Particularly, weatherstrip 88 and crossbar 90 have a length generally equal to the length of front wall 22. Crossbar 90 has a width generally equal to and for slideable receipt between head portions 52 and legs 74 of connectors 50 of rails 36 and a height generally equal to and for receipt between legs 72 and catches 76 of legs 74. Catches 76 generally allow crossbar 90 to be pushed vertically downward flexing leg 74 to allow crossbar 90 to pass thereby and prevent crossbar 90 from passing vertically upward after passing catches 76. As the length of front wall 22 varies between the models and manufacturer of trucks 12, weatherstrip 88 could be cut to a length equal to the spacing between head portions 52 of connectors 50, with the ends of cross bar 90 extending beyond the ends of weatherstrip 88 and the L-shaped portions of connectors 50. Alternately, weatherstrip 88 having a length equal to cross bar 90 can be notched corresponding to head portions 52 and/or legs 72. The weatherstrip element can then be slid between legs 74 and head portions 52 such that legs 74 slide between crossbar 90 and weatherstrip 88, and depending upon the type of notch cut in weatherstrip 88, with weatherstrip 88 sandwiched between crossbar 90 and head portions 52 or located on opposite sides of head portions 52. Then, weatherstrip 88 could be further notched corresponding to tenons 78 of connectors 50 to allow attachment of corner locks 80. It can be appreciated that since weatherstrip 88 is stretched over legs 74 and tenons 78, tenons 78 will tend to burst out of weatherstrip 88 when the stretched weatherstrip 88 is cut therefor.

In the most preferred form, the upper edges of side wall 18, rail 36 (and tabs 54 received therein), tubular portion 40 of rail 38 (and tabs 54 received therein) and the lower edge of side wall 28 on each side of truck 12 include an aligned aperture for slideable receipt of a locking pin 92 having a removable cotter key 94 for preventing withdrawal of pin 92 from the aligned apertures. Assembly 10 in the most preferred form further includes a weatherstrip 96 adhesively attached to the lower edge of rear door 34 of topper 26 for abutting with tailgate 24 of truck 12 adjacent its upper edge.

Now that the basic construction of assembly 10 according to the preferred teachings of the present invention has been set forth, the operation and subtle features of assembly 10 can be explained and appreciated. It should initially be appreciated that the manner of connection provided by assembly 10 according to the preferred teachings of the present invention is especially advantageous. Specifically, the upper slide surfaces of rails 36 have complementary shapes to the lower slide surfaces of portions 40 of rails 38 allowing relative sliding of slides 36 and 38 parallel to the slide surfaces. Additionally, the slide surfaces have a simple abutting relation without an interfit allowing separation of slides 36 and 38 by movement perpendicular to the slide surfaces. It can be appreciated that the abutment of legs 44 of rails 38 with the opposite sides of rails 36 generally prevents horizontal movement of rails 38 and topper 26 relative to rails 36 and cargo box 16 in a horizontal direction parallel to the abutting, slide surfaces of rails 36 and 38 and perpendicular to rails 36 and 38 but allows horizontal movement parallel to the abutting, slide surfaces of rails 36 and 38 and parallel to rails 36 and 38 and allows vertical movement perpendicular to the slide surfaces of rails 36 and 38 separating rails 36 and 38. According to the teachings of the present invention, rails 38 can be horizontally slid relative to rails 36 to receive head portions 62 in head portions 52, with it not being necessary to move rails 38 vertically relative to rails 36. With head portions 62 received in head portions 52, connectors 50 and 60 and rails 36 and 38 are unable to move beyond the interlocking position in a first direction parallel to rails 36 and 38 due to the abutment of head portions 52 and 62 but are generally free to move in a second, opposite direction without requiring rails 36 and 38 to be vertically separated. Further, due to the corresponding shapes of head portions 52 and 62, connectors 50 and 60 and rails 36 and 38 are unable to move in a vertical direction perpendicular to the slide surfaces of slides 36 and 38 to separate connectors 50 and 60 when head portions 62 are received in head portions 52. Locking pin 92 prevents horizontal movement of rails 36 and 38 and thus connectors 50 and 60 in the second, opposite direction in particular. It can then be appreciated that with the slide surfaces of rails 36 and 38 abutting together along their entire lengths, with head portions 62 of connectors 60 received in head portions 52 of connectors 50, and with locking pins 92 extending through the aligned apertures of assembly 10, topper 26 is securely held with no freedom of movement on truck 12 in a similar manner as if topper 26 were directly mounted upon and bolted to truck 12 without assembly 10.

Figure 1:
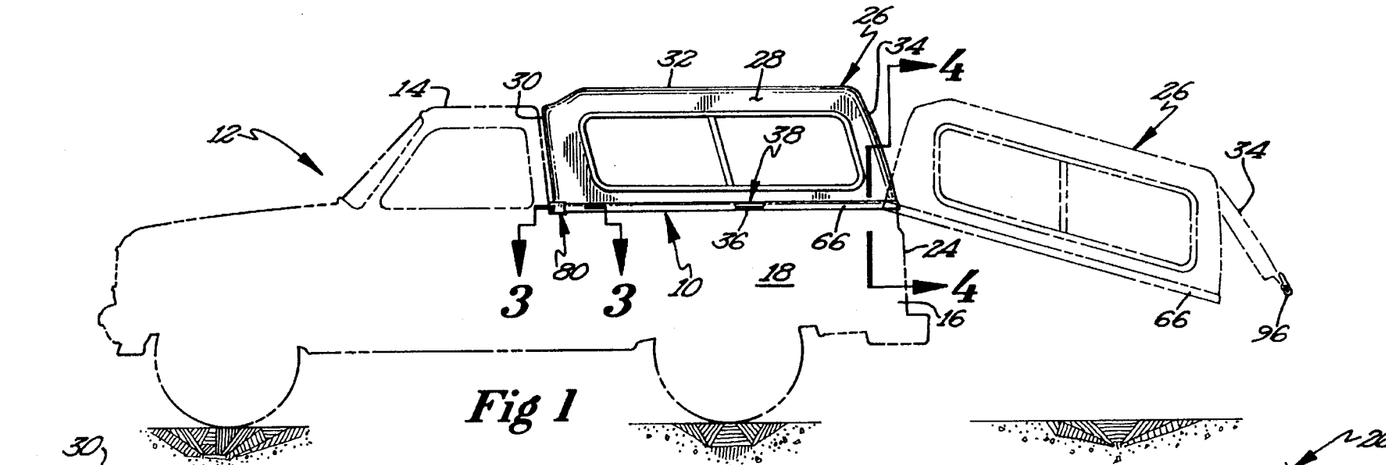
FIG. 1 shows a side view of a pickup truck shown in phantom including a topper mounted thereon by a slideable mounting assembly according to the preferred teachings of the present invention, with the topper also shown in phantom in an alternate position, and with portions broken away to show constructional details.
Figure 2:
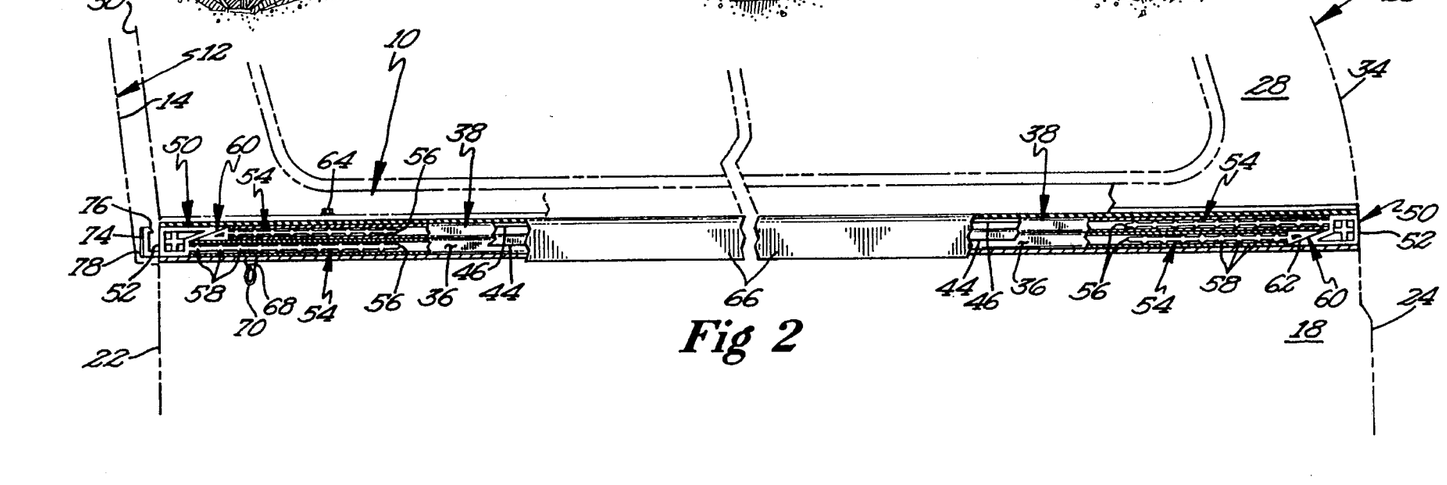
FIG. 2 shows an enlarged side view of the slideable mounting assembly of FIG. 1, with portions broken away to show constructional details.
Figure 3:
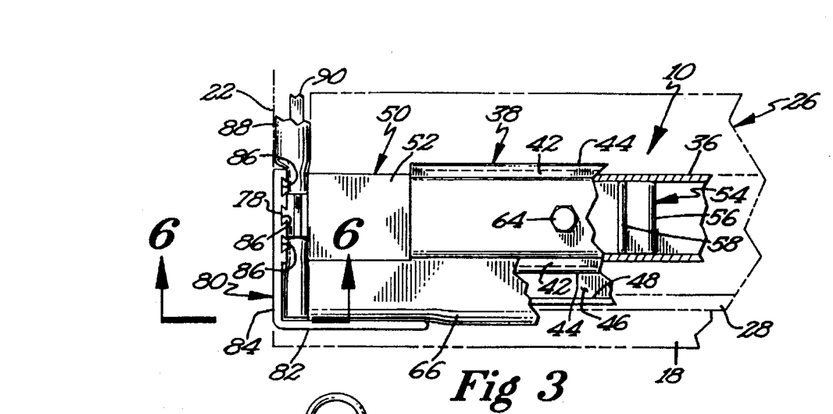
FIG. 3 shows a partial, cross-sectional view of the slideable mounting assembly of FIG. 1 according to section line 3—3 of FIG. 1.
Figure 4:
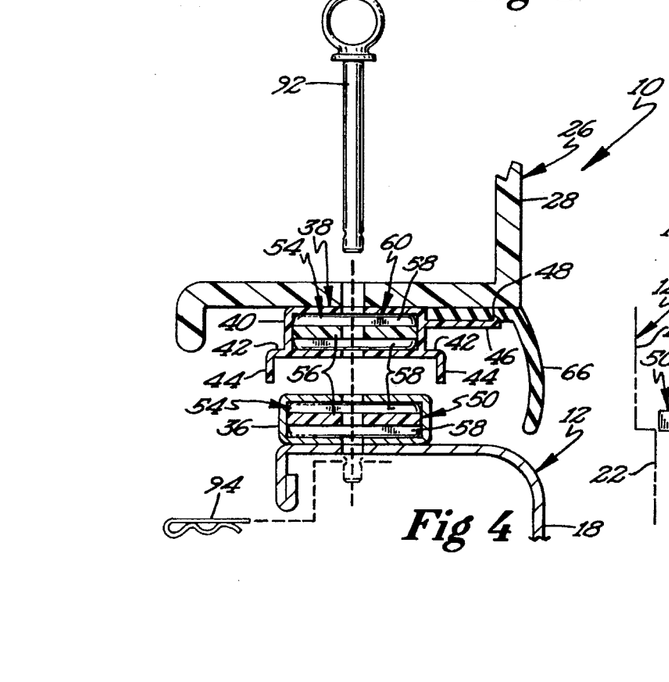
FIG. 4 shows an exploded, cross-sectional view of the slideable mounting assembly of FIG. 1 according to section line 4—4 of FIG. 1.

However, with pins 92 removed from assembly 10, topper 26 can be horizontally slid rearward from truck 12 with legs 44 on opposite sides of rails 36 generally preventing horizontal movement in directions other than parallel to rails 36 and 38. Thus, assembly 10 according to the preferred teachings of the present invention is able to operate in similar manners as prior mounting assemblies having interfitting rails. However, after topper 26 has been slid such that head portions 62 of connectors 60 are not received in head portions 52 of connectors 50, assembly 10 according to the preferred teachings of the present invention provides freedom of movement between topper 26 and truck 12 which was not possible with prior mounting assemblies. Specifically, rails 38 and topper 26 can be tipped from end-to-end at an angle relative to rails 36. For example, the rear of topper 26 can be positioned below rails 36 in a manner as shown in phantom in FIGS. 1 and 7. This is especially advantageous during installation of topper 26. Specifically, the front of topper 26 can be raised while the rear of topper 26 rests upon the ground. Then topper 26 can be moved relative to truck 12 such as by pulling topper 26 along the ground until rails 38 can be supported upon head portions 62 of connectors 60 of rails 36. At that time, the rear of topper 26 can be raised pivoting topper 26 about the abutment position of rails 38 with head portions 62 of rails 36 and pushed forward to position topper 26 over cargo box 16. Thus, since it is not necessary for topper 26 to be horizontal during installation as was required in prior mounting assemblies, topper 26 can be more readily installed or removed, even by a single person.

Likewise, often rear door 34 has a height less than the height of top 32 of topper 26. When it is desired to place an object into box 16 and topper 26 having a height less than top 32 but greater than rear door 34, topper 26 can be slid forward after pins 92 have been removed to remove head portions 62 of connectors 60 from head portions 52 of connectors 50. At that time, the rear of topper 26 can be raised while head portions 62 of connectors 60 of rails 38 rest upon rails 36, with the front of topper 26 pivoting about head portions 62 with the rear of topper 26 at a height greater than the object, the object can then be pushed upon the floor of cargo box 16 until it is within topper 26. Topper 26 can then be lowered until rails 38 rest upon rails 36 throughout their entire lengths, slid forward to position head portions 62 of connectors 60 within head portions 52 of connectors 50, and pins 92 inserted to again secure topper 26 to truck 12.

It should then be noted that when rails 38 and topper 26 are tipped at an angle relative to rails 36, at least portions of legs 44 are positioned on opposite sides of rails 36 at the contact point of rails 38 therewith to generally prevent horizontal movement in directions other than parallel to rails 36 and 38. Further, the contact when rails 38 and topper 26 are tipped relative to rails 36 is generally at heads 62 of connector 60, with the wedge shape being advantageous in providing a pivot contact between rails 36 and 38. It should also be appreciated that connectors 50 which are more prone to catching on objects with topper 26 removed are located at the front ends of rails 36 adjacent cab 14 to shield connectors 50 whereas connectors 60 which are less likely to catch on objects are located at the rear ends of rails 36.

Additionally, topper 26 can be tipped from side-to-side utilizing assembly 10 according to the preferred teachings of the present invention. Specifically, after topper 26 has been slid to remove head portions 62 of connectors 60 from head portions 52 of connectors 50, one side of topper 26 can be raised to vertically separate slide rail 38 from slide rail 36 on that side while slide rail 38 pivots upon slide rail 36 on the other side of topper 26 on truck 12. Thus, it is possible to remove an object from the front of cargo box 16 without crawling to the front of cargo box 16 through tailgate 24 or without sliding topper 26 significantly rearward in a manner as was required in prior slide assemblies.

It should be noted that the construction of assembly 10 according to the teachings of the present invention is advantageous for several reasons. Specifically, the use of connectors 50 and 60 separable from rails 36 and 38 allows rails 36 and 38 (as well as seals 66 and weatherstrips 88 and 96) to be formed by extrusion to reduce capital mold costs. Further, the multicomponent rails 36 and 38 allow shipping in a smaller container deliverable by most parcel delivery services which would not deliver containers if rails 36 and 38 were of a single piece. Likewise, slide rails 36 are formed of aluminum to provide an aesthetic appearance for truck 12 if operated without topper 26 attached thereto. Likewise, slide rails 38 formed of dissimilar materials from rails 36 and particularly PVC plastic and aluminum in the most preferred form reduces frictional forces in the sliding of rails 38 on rails 36. As shown, connectors 50 and 60 can have removed portions which do not detrimentally affect operation but reduces the amount of material needed for formation. Likewise, rails 36 and 38 between connectors 50 and 60 provide obstruction-free sliding surfaces and specifically do not include any protrusions or depressions which could detrimentally affect the ability to slide rails 36 and 38 and which could catch on or fill in with objects or debris when rails 36 and 38 are separated or slid from their interlocked position with connectors 50 and 60 in a spaced condition. Likewise, connectors 50 and 60 secured to rails 36 and 38 by bolts 64 and 68 are not movable relative thereto and are not susceptible to wear.

Now that the basic teachings of the present invention have been explained, many extensions and variations will be obvious to one having ordinary skill in the art. For example, in the preferred form, assembly 10 has been shown and described in the mounting of topper 26 to pickup truck 12. Assembly 10 may have applications where a cover or the like is slideably relative to a box or other object by persons skilled in the art according to the teachings of the present invention.

Likewise, although head portions 52 and 62 of connectors 50 and 60 in the most preferred form of the present invention utilize a wedge shape and are believed to be particularly advantageous, heads 52 and 62 could have other shapes and configurations according to the teachings of the present invention such as but not limited to a horizontal pin which is slideably received in a complementary socket.

Likewise, assembly 10 of the most preferred form of the present invention includes several unique features which are believed to produce synergistic results. However, such features could be utilized singly or in other combinations according to the teachings of the present invention. For example, the weatherstripping feature of the present invention could be utilized in prior slide mount assemblies and would be advantageous therewith.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Assembly comprising, in combination: a first slide having a first slide surface, a first end, and a second end; a second slide having a first slide surface, a first end, and a second end, with the first slide surfaces of the first and second slides having complementary shapes allowing relative sliding of the first and second slides parallel to the first slide surfaces and allowing separation of the first and second slides by movement perpendicular to the first slide surfaces; means secured adjacent the first ends of the first and second slides and secured adjacent the second ends of the first and second slides for interlocking the ends with the slides in an interlocking position, with the interlocking means when secured to the slides preventing separation of the slides in the interlocking position by movement perpendicular to the first slide surfaces, with the interlocking means when secured to the slides preventing the slides from sliding parallel to the first slide surfaces beyond the interlocking position in a first direction, with the interlocking means when secured to the slides allowing sliding of the slides parallel to the first slide surfaces from the interlocking position opposite to the first direction; and means for preventing relative sliding of the first and second slides parallel to the first slide surfaces opposite to the first direction.

2. Assembly comprising, in combination: a first slide having a first slide surface, a first end, and a second end; a second slide having a first slide surface, a first end, and a second end, with the first slide surfaces of the first and second slides having complementary shapes allowing relative sliding of the first and second slides parallel to the first slide surfaces and allowing separation of the first and second slides by movement perpendicular to the first slide surfaces; means adjacent the first ends of the first and second slides and adjacent the second ends of the first and second slides for interlocking the ends with the slides in an interlocking position, with the interlocking means preventing separation of the slides by movement perpendicular to the first slide surfaces, preventing the slides from sliding parallel to the first slide surfaces beyond the interlocking position in a first direction, and allowing sliding of the slides parallel to the first slide surfaces from the interlocking position opposite to the first direction; and means for preventing relative sliding of the first and second slides parallel to the first slide surfaces opposite to the first direction; and wherein the interlocking means comprises, in combination: male head portions arranged parallel to the first slide surfaces and to the first direction and adjacent the first end of the first slide and the second end of the second slide; and female head portions of a shape corresponding to and for receipt of the male portions and arranged parallel to the first surfaces and to the first direction and adjacent the first end of the second slide and the second end of the first slide with the male head portions being received in the female head portions of both the first and second ends of the first and second slides by movement of the slides in the first direction.

3. The assembly of claim 2 wherein the shape of the female head portions receiving the male head portions and of the male head portions are wedge-shaped of an increasing size perpendicular to the first slide surfaces to cam the first and second ends together in a direction perpendicular to the first slide surfaces when the first and second slides are slid in the first direction towards the interlocking position.

4. The assembly of claim 3 wherein the shape of the female head portions receiving the male head portions and of the male head portions are wedge-shaped of an increasing size parallel to the first slide surfaces to cam the first and second ends in a plane parallel to the first slide surfaces to a centered condition.

5. The assembly of claim 2 wherein the shape of the female head portions receiving the male head portions and of the male head portions are wedge-shaped of an increasing size parallel to the first slide surfaces to cam the first and second ends in a plane parallel to the first slide surfaces to a centered condition.

6. Assembly comprising, in combination: a first slide having a first slide surface, a first end, and a second end; a second slide having a first slide surface, a first end, and a second end, with the first slide surfaces of the first and second slides having complementary shapes allowing relative sliding of the first and second slides parallel to the first slide surfaces and allowing separation of the first and second slides by movement perpendicular to the first slide surfaces; means adjacent the first ends of the first and second slides and adjacent the second ends of the first and second slides for interlocking the ends with the slides in an interlocking position, with the interlocking means preventing separation of the slides by movement perpendicular to the first slide surfaces, preventing the slides from sliding parallel to the first slide surfaces beyond the interlocking position in a first direction, and allowing sliding of the slides parallel to the first slide surfaces from the interlocking position opposite to the first direction; and means for preventing relative sliding of the first and second slides parallel to the first slide surfaces opposite to the first direction; wherein the interlocking means comprises, in combination: male head portions arranged parallel to the first slide surfaces and adjacent the first end of the first slide and the second end of the second slide; and female head portions of a shape corresponding to and for receipt of the male portions arranged parallel to the first surfaces and adjacent the first end of the second slide and the second end of the first slide; wherein the slides are tubular in shape having annular cross sections perpendicular to the first direction; and wherein the male and female head portions include tabs slideably received in the annular cross sections of the slides.

7. The assembly of claim 6 wherein each of the tabs comprise, in combination: a plate extending from the head portion parallel to the first slide surface of the slide and the first direction; and a plurality of protuberances integrally formed on the plate parallel to the first slide surface of the slide.

8. The assembly of claim 7 wherein the first slide includes means for preventing sliding of the first slide relative to the second slide parallel to the first slide surfaces and perpendicular to the first direction.

9. The assembly of claim 8 wherein the sliding preventing means perpendicular to the first direction comprises first and second legs located on opposite sides of the first slide surface of the first slide and located on opposite sides of the second slide.

10. The assembly of claim 9 wherein the sliding preventing means opposite to the first direction comprises a pin slideably received in apertures formed in the first and second slides perpendicular to the first slide surfaces.

11. The assembly of claim 6 wherein the first slide is secured to a first side wall of a topper by first bolts, with the first bolts also securing the tabs in the first slide; and wherein the second slide is secured to a first side wall of a pickup truck by second bolts, with the second bolts also securing the tabs in the second slide.

12. The assembly of claim 11 wherein the first slide further comprises a seal leg extending parallel to the first surface; and wherein the assembly further comprises, in combination: a seal held by the seal leg and abutting with the first side wall of the pickup truck.

13. The assembly of claim 12 wherein the seal includes a first portion sandwiched between the first side wall of the topper and the seal leg, with the seal leg including a barb for engaging the first portion of the seal.

14. The assembly of claim 12 further comprising, in combination: a corner lock having a generally L-shape including a first leg and a second leg; and means for removably securing the first leg to the female head portion of the second slide with the second leg extending generally parallel to the first direction, with the seal being removably slideably received within the second leg of the corner lock intermediate the second leg and the first and second slides.

15. The assembly of claim 14 wherein the removably securing means removably secures the first leg to the female head portion with the second leg at differing and distinct spacings from the second slide.

16. The assembly of claim 15 wherein the removably securing means comprises, in combination: a male component secured to the female head portion and a plurality of female components secured to the first leg of the corner lock and of a size for slideable receipt of the male component in a direction perpendicular to the first direction.

17. The assembly of claim 14 further comprising, in combination: a weatherstrip element for a front wall of the pickup truck; and means for removably securing the weatherstrip element to the female head portion of the second slide generally perpendicular to the first direction.

18. The assembly of claim 17 wherein the weatherstrip element removably securing means comprises, in combination: a first leg extending from the female head portion parallel to the first direction and opposite the slide; and a second leg extending from the first leg spaced from the female head portion, with the weatherstrip element slideably received between the second leg and the female head portion.

19. The assembly of claim 18 wherein the corner lock removably securing means includes a portion secured to the second leg of the weatherstrip element removably securing means.

20. The assembly of claim 19 wherein the weatherstrip element comprises, in combination: a crossbar; and a tubular weatherstrip slid over the crossbar, with the crossbar being slideably received between the second leg and the female head portion.

21. The assembly of claim 1 wherein the first slide includes means for preventing sliding of the first slide relative to the second slide parallel to the first slide surface and perpendicular to the first direction.

22. The assembly of claim 1 wherein the slides are tubular in shape having annular cross sections perpendicular to the first direction; and wherein the interlocking means includes tabs slideably received in the annular cross sections of the slides.

23. Assembly for slideably mounting a topper to a cargo box, with the cargo box and topper each including a first side wall and a front wall, with the topper including means for longitudinally sealing between the first side walls of the topper and the cargo box, comprising, in combination: a first slide secured to the first side wall of the cargo box and having an end; a second slide secured to the first side wall of the topper for slideable receipt on the first slide and having an end; a corner lock having a generally L-shape including a first leg and a second leg; and means for removably securing the first leg adjacent to the end of the first slide and fixed relative to the first slide, with the second leg extending generally parallel to the side wall of the cargo box, with the longitudinal sealing means being removably slideably received within the second leg of the corner lock intermediate the second leg and the first and second slides.

24. The assembly of claim 23 wherein the removably securing means removably secures the first leg adjacent to the end of the first slide with the second leg at one of multiple, fixed positions at differing and distinct spacings from the first slide.

25. The assembly of claim 1 wherein the interlocking means are separable from both of the first and second slides and removably secured adjacent the ends of the first and second slides.

26. Assembly for slideably mounting a topper to a cargo box, with the cargo box and topper each including first and second side walls and a front wall, comprising, in combination: first and second slides secured to the first and second side walls of the cargo box and each having an end; third and fourth slides secured to the first and second side walls of the topper for slideable receipt on the first and second slides, respectively; a weatherstrip element; and means for removably securing the weatherstrip element fixed adjacent to the ends of the first and second slides and independent of the position of the third and fourth slides relative to the first and second slides, with the weatherstrip element having a length generally equal to the front wall of the cargo box and extending between the front walls of the cargo box and the topper when the third and fourth slides are slideably received on the first and second slides with the front walls being aligned.

27. The assembly of claim 26 wherein the weatherstrip element removably securing means comprises, in combination: first legs extending from and parallel to the first and second box slides; and second legs extending from the first legs spaced from the first and second box slides, with the weatherstrip element slideably received between the second legs and the first and second box slides.

28. The assembly of claim 22 wherein the first slide is secured to a first side wall of a topper by first bolts, with the first bolts also securing the tabs in the first slide; and wherein the second slide is secured to a first side wall of a pickup truck by second bolts, with the second bolts also securing the tabs in the second slide.

29. The assembly of claim 1 wherein the sliding preventing means opposite to the first direction comprises a pin slideably received in apertures formed in the first and second slides.

30. The assembly of claim 29 wherein the first slide is secured to a first side wall of a topper; and wherein the second slide is secured to a first side wall of a pickup truck, with the pin extending through portions of the first side walls of both the topper and the pickup truck.

31. The assembly of claim 2 wherein the sliding preventing means opposite to the first direction comprises a pin slideably received in apertures formed in the first and second slides.

32. The assembly of claim 31 wherein the first slide is secured to a first side wall of a topper; and wherein the second slide is secured to a first side wall of a pickup truck, with the pin extending through portions of the first side walls of both the topper and the pickup truck.

33. The assembly of claim 24 wherein the removably securing means comprises, in combination: a male component fixed relative to the first slide and a plurality of female components secured to the first leg of the corner lock and of a size for slideable receipt of the male component.

34. The assembly of claim 22 wherein each of the tabs comprise, in combination: a plate extending from the head portion parallel to the first slide surface of the slide and the first direction; and a plurality of protuberances integrally formed on the plate parallel to the first slide surface of the slide.

35. Assembly for slideably mounting a topper to a cargo box, with the cargo box and topper each including a side wall and a front wall, comprising, in combination: a first slide secured to the side wall of the cargo box and having a first slide surface; a second slide secured to the side wall of the topper having a first slide surface for slideable receipt on the first slide surface of the first slide, with the second slide including a seal leg spaced from and extending parallel to the first slide surface of the second slide; and a gasket seal held by the seal leg of the second slide and abutting with the side wall of the cargo box.

36. The assembly of claim 35 wherein the gasket seal includes a first portion sandwiched between the side wall of the topper and the seal leg, with the seal leg including a barb for engaging the first portion of the gasket seal.

* * * * *